(12) United States Patent
Guo (10) Patent No.: US 10,587,388 B2
(45) Date of Patent: Mar. 10, 2020

(54) METHOD AND APPARATUS FOR UPLINK CONTROL CHANNEL DETECTION

(71) Applicant: Cavium, LLC, Santa Clara, CA (US)

(72) Inventor: Yuanbin Guo, Mountain House, CA (US)

(73) Assignee: Cavium, LLC., Santa Clara, CA (US)

( * ) Notice: Subject to any disclaimer, the term of this patent is extended or adjusted under 35 U.S.C. 154(b) by 40 days.

(21) Appl. No.: 15/683,376

(22) Filed: Aug. 22, 2017

(65) Prior Publication Data

US 2019/0068349 A1 Feb. 28, 2019

(51) Int. Cl.
*H04L 5/00* (2006.01)
*H04W 72/04* (2009.01)
*H04L 1/00* (2006.01)

(52) U.S. Cl.
CPC .......... *H04L 5/0057* (2013.01); *H04L 1/0026* (2013.01); *H04L 1/0031* (2013.01); *H04L 1/0045* (2013.01); *H04L 1/0057* (2013.01); *H04L 1/0072* (2013.01); *H04L 5/0055* (2013.01); *H04W 72/042* (2013.01); *H04W 72/0466* (2013.01); *H04L 1/0023* (2013.01); *H04L 5/0048* (2013.01)

(58) Field of Classification Search
CPC ... H04L 5/0057; H04L 5/0055; H04L 5/0048; H04W 72/0466; H04W 72/042
See application file for complete search history.

(56) References Cited

U.S. PATENT DOCUMENTS

| 8,340,043 | B2 | 12/2012 | Suzuki et al. |
| 8,619,633 | B2 | 12/2013 | Cheng et al. |
| 8,804,636 | B2 | 8/2014 | Heo et al. |
| 8,848,686 | B1 | 9/2014 | Cheng et al. |
| 8,989,123 | B2 | 3/2015 | Yin |
| 9,030,948 | B2 | 5/2015 | Xu et al. |

(Continued)

OTHER PUBLICATIONS

Wang Dan, Decoding of Uplink Control Information Encoded with Placeholders in long term Evolution, Journal of Chongqing University, China.

(Continued)

*Primary Examiner* — Rina C Pancholi
(74) *Attorney, Agent, or Firm* — JW Law Group; James M. Wu (57) ABSTRACT

Methods and apparatus for uplink control channel detection. In an exemplary embodiment, a method includes generating Top-Q Channel Quality Indicator (CQI) candidates from information received over an uplink control channel, generating a CQI symbol for each of the Top-Q CQI candidates, and generating a CQI energy metric from the CQI symbols. If the uplink control channel is formatted in format 2, then performing operations of combining the CQI energy metric with a pilot energy metric to generate a combined metric and searching the combined metric to determine transmitted CQI bits. If the control channel is formatted in format 2a or format 2b, then performing operations of generating an acknowledgement (ACK) energy metric for ACK candidates, combining the CQI energy metric, the pilot energy metric, and the ACK energy metric to generate the combined metric, and searching the combined metric to determine transmitted CQI bits and ACK bits.

19 Claims, 7 Drawing Sheets

(56) References Cited

U.S. PATENT DOCUMENTS

| | | | |
|---|---|---|---|
| 9,325,451 B1* | 4/2016 | Kerhuel | H04L 1/0054 |
| 2011/0080880 A1* | 4/2011 | Yin | H04B 7/0682 |
| | | | 370/329 |
| 2015/0110050 A1* | 4/2015 | Guo | H04L 5/0057 |
| | | | 370/329 |

OTHER PUBLICATIONS

Clarification for HARI-ACK/RI Replica on PUSCH with SU-MIMO, Journal, Jun. 28-Jul. 2, 2010, Dresden, Germany.
UCI Transmission in the Presence of UL-SCH Data, Journal, Jun. 28-Jul. 2, 2010, Dresden, Germany.
LTE UL Channel Decoder, Journal, Jun. 24, 2009, United States.
Yi Wu, Danyo Danev and Erik G. Larsson, On ACK/NACK Messages Detection in the LTE PUCCH with Multiple Receive Antennas, Journal, Aug. 27-31, 2012, 20th European Signal Processing Conference, Bucharest, Romania.
3rd Generation Partnership Project; Technical Specification Group Radio Access Network;Evolved Universal Terrestrial Radio Access (E-UTRA); Physical Channels and Modulation (Release 10), 2013.
Fatang Chen, Taotao Liang and Shaoxu Wu, A New Design of Receiver for LTE PUCCH FORMAT 2, 2012 International Conference on Computer Technology and Science (ICCTS 2012), IPCSIT vol. 47 (2012), China.
Pucch TxD for Formats 2/2a/2b for LTE-Advanced, journal, Apr. 12-16, 2010, Beijing, China.
Dan Wang, Shizhou Yang, Yu Liu, Efficient Receiver Scheme for LTE PUCCH, Journal, Mar. 2012, vol. 16 No. 3, IEEE Communicatins Letter.

* cited by examiner

METHOD AND APPARATUS FOR UPLINK CONTROL CHANNEL DETECTION

FIELD

The exemplary embodiments of the present invention relate to telecommunications networks. More specifically, the exemplary embodiments of the present invention relate to receiving and processing data streams via a wireless communication network.

BACKGROUND

There is a rapidly growing trend toward mobile and remote data access over high-speed communication networks, such as provided by 3G or 4G cellular services. For example, using these services, users now rely on their smartphones for texting, access to email, banking, and social media, and for sending and receiving pictures and video.

Typically, wireless network performance depends in part on the quality of the transmission channel. For example, if the channel conditions are good, the network may perform with higher speed and capacity than when the channel conditions are poor. To obtain the best network performance, wireless networks may rely on user devices (e.g., user equipment "UE") to report control information back to the network. The control information includes parameters indicating the channel conditions and/or transmission parameters. One mechanism available to user devices to report control information back to the network is through a dedicated physical uplink control channel (PUCCH). The network receives the control information over this channel and uses the received parameters to adjust data transmissions for optimum performance based on the network conditions indicated by the received parameters.

The PUCCH carries important control information, including Channel Quality Indicator (CQI) and Hybrid Automatic Repeat Request Acknowledge (HARQ-ACK) information. The PUCCH may be formatted in several ways to communicate the control information, such as format 1, format 2x (format 2, 2a, 2b) and formats 3, 4, 5, etc. These formats identify how the control information is encoded and/or modulated in the PUCCH.

The performance of ACK messages play an important role in the overall downlink performance as the residual error rate of HARQ is in the same order of the feedback error rate of the ACK bits. The CQI information represents the recommended modulation scheme and coding rate to be used for downlink transmissions. Its accuracy greatly impacts the overall system throughput that can be achieved in a noisy channel. Thus, improving the error performance of both CQI and ACK detection is desirable to the achieve improved network throughput Therefore, it is desirable to have a detection mechanism that efficiently detects with high probability, control bit information transmitted from a UE over a PUCCH.

SUMMARY

In various exemplary embodiments, methods and apparatus are provided for uplink control channel detection.

In an exemplary embodiment, a method is provided that includes generating Top-Q Channel Quality Indicator (CQI) candidates from information received over an uplink control channel, generating a CQI symbol for each of the Top-Q CQI candidates, and generating a CQI energy metric from the CQI symbols. If the uplink control channel is formatted in format 2, then performing operations of combining the CQI energy metric with a pilot energy metric to generate a combined metric and searching the combined metric to determine transmitted CQI bits. If the control channel is formatted in format 2a or format 2b, then performing operations of generating an acknowledgement (ACK) energy metric for ACK candidates, combining the CQI energy metric, the pilot energy metric, and the ACK energy metric to generate the combined metric, and searching the combined metric to determine transmitted CQI bits and ACK bits.

In another exemplary embodiment, an apparatus is provided that includes a Top-Q Reed-Muller (RM) decoder that generates Top-Q Channel Quality Indicator (CQI) candidates from information received over an uplink control channel. The apparatus also includes a symbol generator that generates a CQI symbol for each of the Top-Q CQI candidates, and an estimator that generates a CQI energy metric for the CQI symbols. The apparatus also includes an energy metric combiner that combines the CQI energy metric with a pilot energy metric to generate a combined metric if the uplink control channel is formatted in format 2. The energy metric combiner combines the CQI energy metric, the pilot energy metric, and an acknowledgement (ACK) energy metric to generate the combined metric if the uplink control channel is formatted in format 2a or format 2b. The apparatus also includes a metric searcher that searches the combined metric to determine transmitted CQI bits if the uplink control channel is formatted in format 2, and to determine the transmitted CQI bits and ACK bits if the uplink control channel is formatted in format 2a or 2b.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or other constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Figure 1:
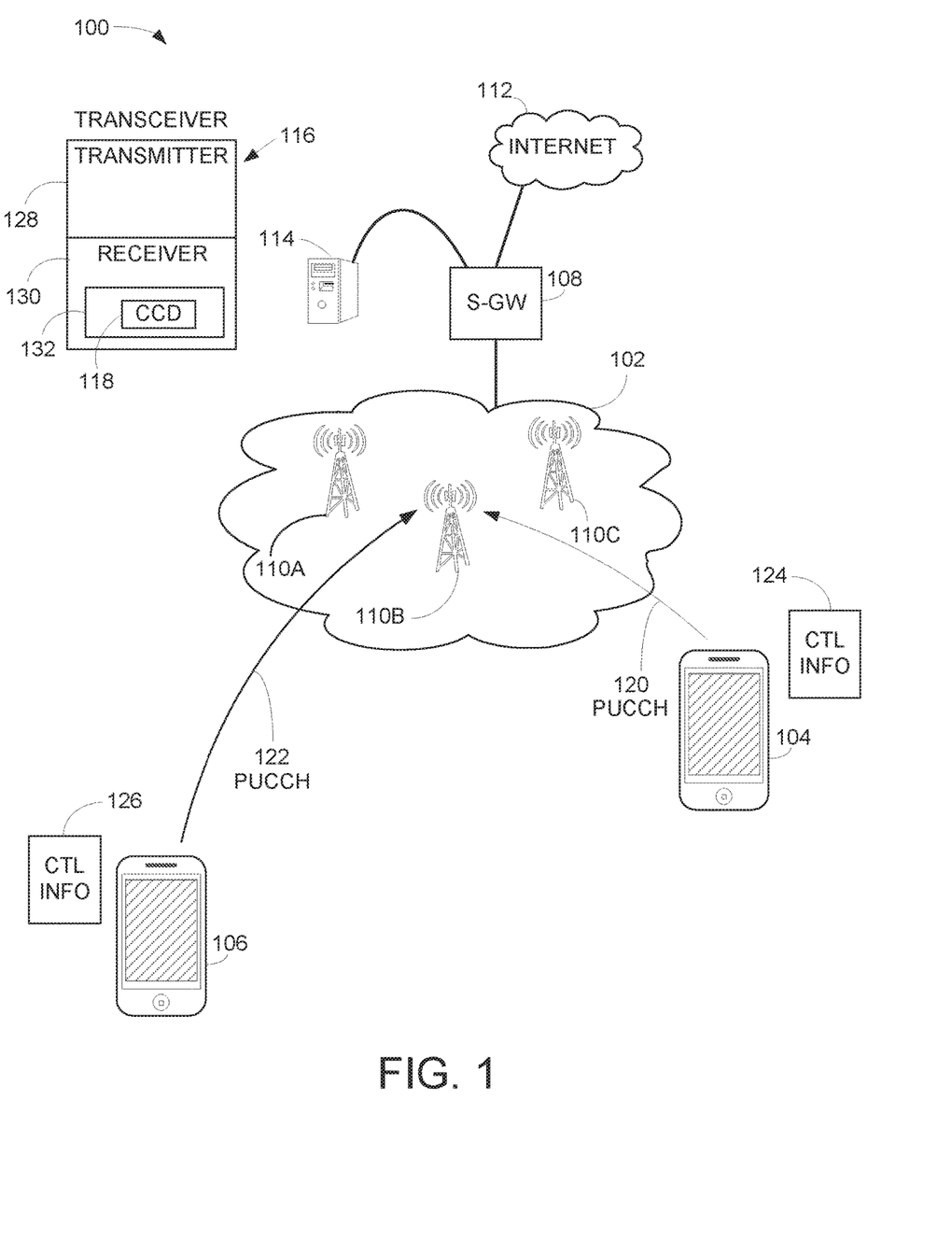
FIG. 1 shows a communication network comprising a transceiver having an exemplary embodiment of a control channel detector (CCD) that efficiently receives and detects control bit information transmitted from user equipment over a dedicated PUCCH.

FIG. 1 shows a communication network 100 comprising a transceiver 116 having an exemplary embodiment of a control channel detector (CCD) 118 that efficiently receives and detects control bit information transmitted from user equipment over a dedicated PUCCH. The network 100 may also be referred to as a third generation (3G), fourth generation (4G), long term evolution (LTE), or combination of 3G and 4G cellular network configuration.

The communication network 100 includes a server 114 that includes the transceiver 116. The transceiver 116 has a transmitter portion 128 and a receiver portion 130. The server 114 communicates with a serving gateway (S-GW) 108 that further communicates with cell site 102 and the Internet 112. The cell site 102 includes radio towers 110 and associated base stations (not shown).

User equipment (UE) 104 and user equipment 106 are in communication with base station 110B. For example, the UEs 104, 106 can be cellular phones, handheld devices, tablet computers or iPad® devices. It should be noted that the underlying concepts of the exemplary embodiments of the present invention would not change if one or more blocks (or devices) were added or removed from the communication network 100.

In an exemplary embodiment, the UE 104 transmits control bit information 124 to the server 114 using PUCCH 120 and the UE 106 transmits control bit information 126 to the server 114 using PUCCH 122. In an exemplary embodiment, the control bit information includes CQI bits and HARQ-ACK bits.

The receiver portion 130 includes receiver processing hardware (RPH) 132. In an exemplary embodiment, the RPH 132 includes the CCD 118, which is used to perform efficient detection of the control information received over PUCCH from the user equipment. In various exemplary embodiments, the CCD 118 is able to detect the control bit information from received subframes with higher probability than conventional systems to enhance the overall efficiency of the receiver and the operation of the communication network 100.

In an exemplary embodiment, the PUCCH is formatted in a selected format. For example, format 2x encodes and modulates the CQI/ACKs in three different ways, namely, format 2, format 2a, and format 2b. For example, the CQI/ACK are modulated based on the number of information bits, as shown in the Table 1 below.

TABLE 1

| PUCCH format | Modulation scheme | Number of coded bits per subframe, $M_{bit}$ | Normal CP | Extended CP |
| --- | --- | --- | --- | --- |
| 2 | QPSK | 20 | CQI | CQI or HARQ-ACK + CQI |
| 2a | QPSK + BPSK | 21 | CQI + 1x HARQ-ACK | — |
| 2b | QPSK + QPSK | 22 | CQI + 2x HARQ-ACK | — |

The CQI codewords are coded using a (20, A) block code and are a linear combination of 13 basis sequences denoted by $M_{i,n}$ as defined by the following equation.

$$b_i = \sum_{n=0}^{A-1} (a_n \cdot M_{i,n}) \bmod 2,$$

where i=0, 1, 2, . . . , B−1, and in the basis sequence $M_{i,n}$ for the (20, A) block code, A is the length of the un-coded information bits, which range from 4 to 13. B is the length of the coded bits, which in this case is 20.

Figure 2:
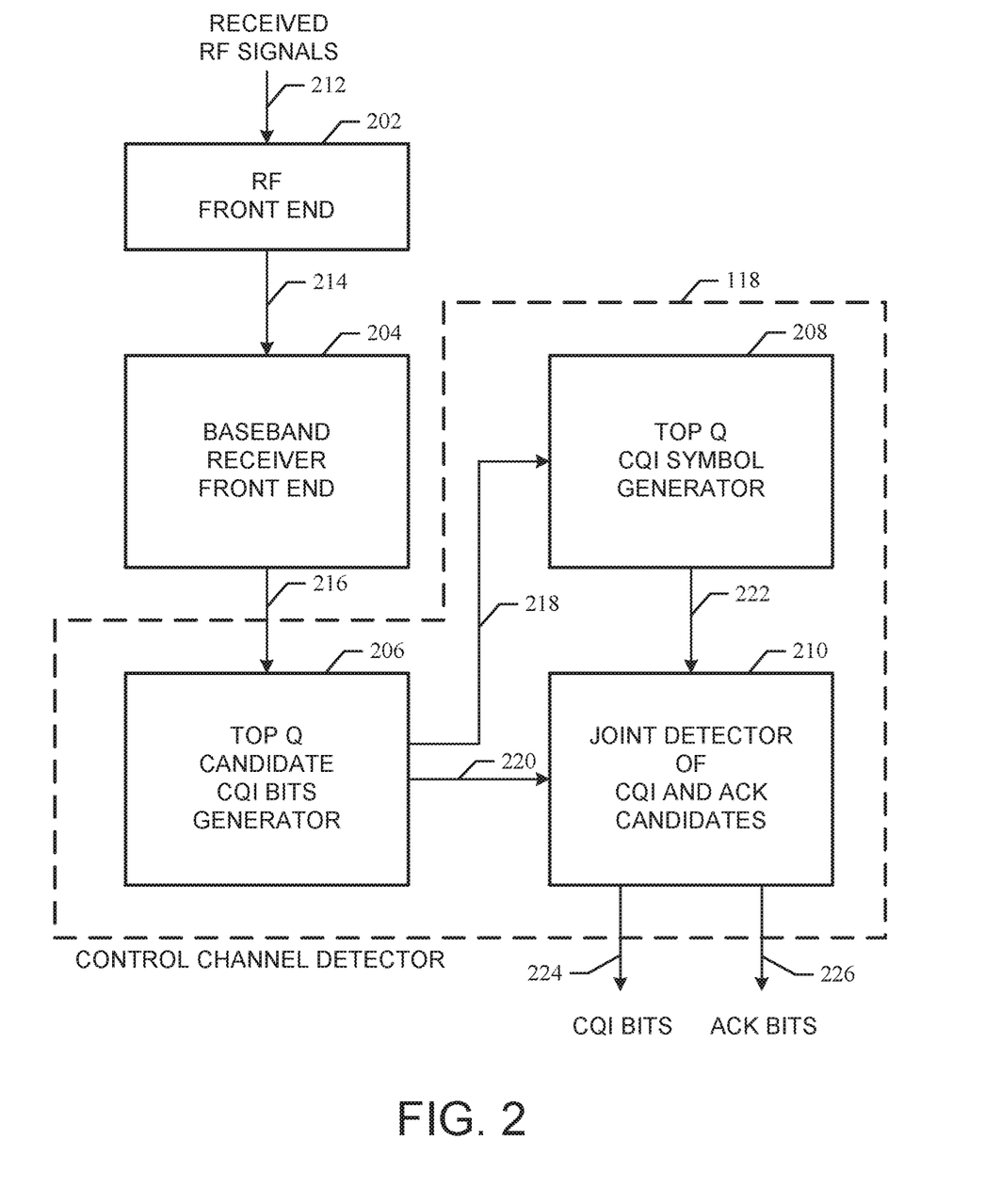
FIG. 2 shows an exemplary embodiment of the control channel detector shown in FIG. 1.

FIG. 2 shows an exemplary embodiment of the control channel detector 118 shown in FIG. 1. For example, the control channel detector 118 operates to receive control bit information contained in received subframes and to determine the transmitted CQI and ACK bits.

During operation, received RF signals 212 are received at an RF front end 202. The received RF signals 212 comprise information transmitted in a PUCCH. The front end passes the received RF signals 214 to a baseband receiver front end 204. For example, the baseband receiver front end 204 is part of the receiver 130 shown in FIG. 1. The baseband receiver front end 204 processes the received RF signals 214 to generate baseband signals 216.

A Top-Q candidate CQI bits detector 206 receives the baseband signals 216 output from the baseband receiver front end 204. The detector 206 operates to detect the top "Q" CQI candidates, where Q is a selected number of candidates. The Top-Q candidates 218 are output to a Top-Q CQI symbol generator 208. The detector 206 also outputs pilot channel metrics 220 to the joint detector 210.

The symbol generator 208 generates symbols 222 for each of the Top-Q CQI candidates. The generated symbols 222 are input to the joint detector 210. If the PUCCH format is 2a or 2b, the detector 210 will generate symbols for all possible ACK candidates. Energy metrics for the CQI candidate symbols, ACK candidate symbols, and the pilot symbols are combined into a search space that is searched to determine the most likely CQI 224 and ACK 226 bits.

Thus, the CCD 118 operates to generate a plurality of CQI candidates and converts these candidates into symbols. Likewise, if format 2a or 2b is used, ACK candidate symbols also are generated. Energy metrics from the symbols are combined into a search space that is searched to determine the final CQI and ACK bits. A detailed description of the CCD 118 is provided below.

Figure 3:
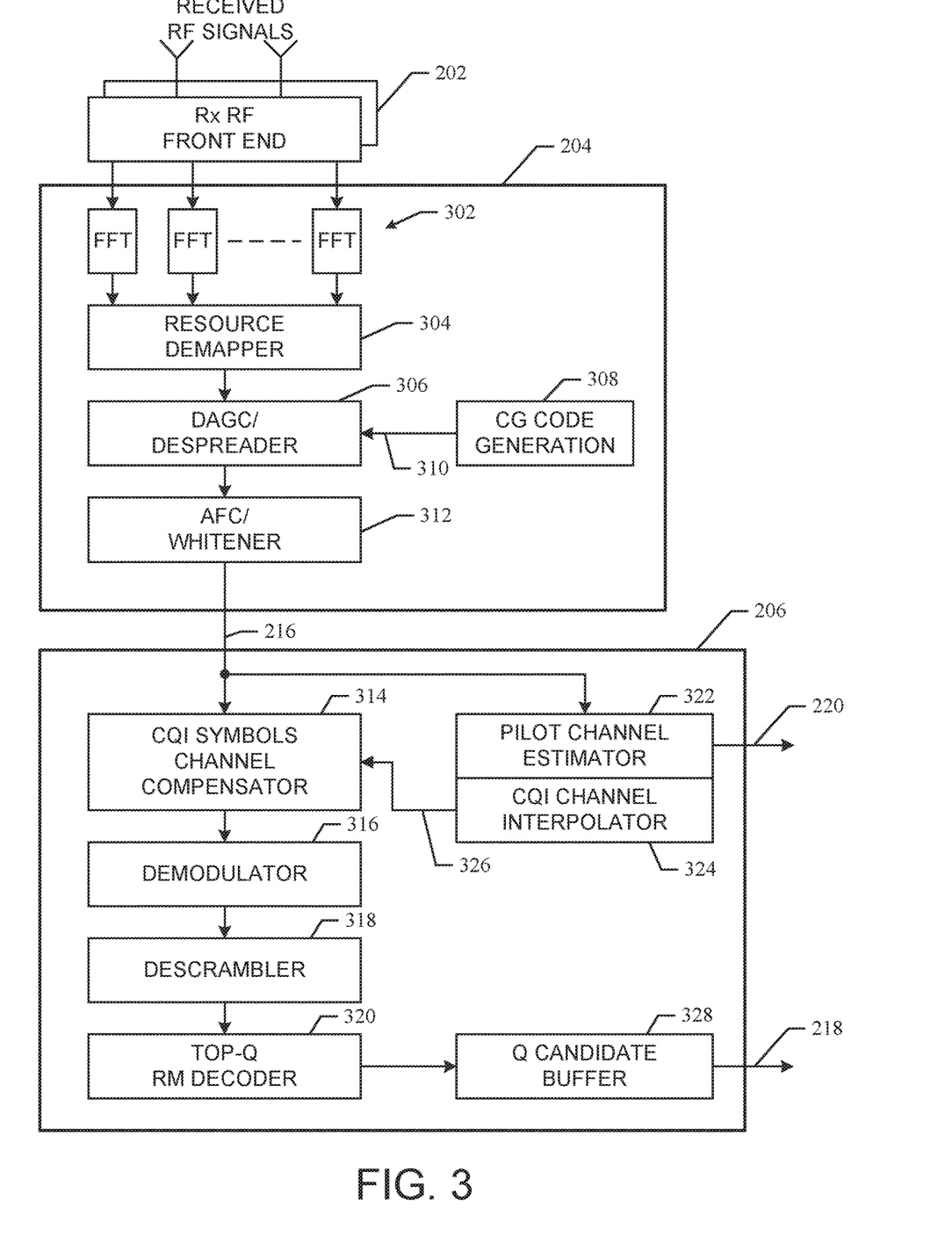
FIG. 3 shows exemplary embodiments of a baseband front end and a Top-Q candidate detector shown in FIG. 2.

FIG. 3 shows exemplary embodiments of the baseband front end 204 and the Top-Q candidate detector 206 shown in FIG. 2. In an exemplary embodiment, the baseband front end 204 comprises FFT processors 302, a resource demapper 304, a digital AGC (DAGC)/despreader 306, a CG code generator 308 and an AFC/whiting processor 312.

During operation, received RF signals comprising a PUCCH are received at the RF front end 202. The RF front end passes the received signals to the FFT processors 302 of the baseband front end 204. The FFT processors 302 convert time domain signals to the frequency domain and output the frequency domain signals to the resource demapper 304. The resource demapper 304 collects the PUCCH signals from the corresponding resource locations. Next, digital AGC (DAGC) is followed by a CG code despreader 306 that uses a CG code 310 generated by a local CG code generator 308 to perform gain control and a despreading operation. To overcome noisy channel condition, some Automatic Frequency Control (AFC) or whitening 312 algorithms may be applied to compensate the frequency offset and equalize the channel. The signals 216 after the channel whitening are fed to the Top-Q CQI candidate detector 206.

The Top-Q candidate CQI bits detector 206 is designed to generate the Top-Q candidates of the CQI bits using pilot channel estimation. In an exemplary embodiment, the Top-Q CQI detector 206 comprises pilot channel estimator 322, CQI channel interpolator 324, CQI symbol channel compensator 314, demodulator 316, descrambler 318, and Q candidate buffer 328. The Top-Q candidate CQI bits detector 206 also comprises a Top-Q Reed Mueller (RM) (20, A) list decoder 320 that generates the Top-Q most likely CQI candidates based on an internal metric comparison within RM decoder. This is achievable by designing the RM decoder so that it can search the internal computation metrics for all possible entries of CQI candidate bits and then produce the Top-Q most possible candidates that then are stored in the Q candidate buffer 328.

During operation, the signals 216 received from the baseband front end 204 are input to the CQI symbols channel compensator 314. The signals 216 from the baseband frontend 204 are also input to the pilot channel estimator 322. The pilot channel estimator 322 determines pilot energy metrics 220 that are output to the joint detector 210. The CQI channel interpolator 324 works with the pilot channel estimator 322 to generate interpolation control 326 that is input to the compensator 314. The compensator 314 compensates the CQI symbols using the interpolation control 326 and outputs compensated signals to the demodulator 316. The demodulator 316 performs symbol demodulation of the CQI symbols and outputs the demodulated CQI information to the descrambler 318. The descrambler 318 descrambles the CQI information and outputs the described CQI information to the Top-Q RM decoder 320. The decoder 320 generates the Top-Q CQI candidates and outputs these candidates to the buffer 328. From the buffer 328, the Top-Q possible CQI candidates 218 are output to the Top-Q CQI symbol generator 208.

Figure 4:
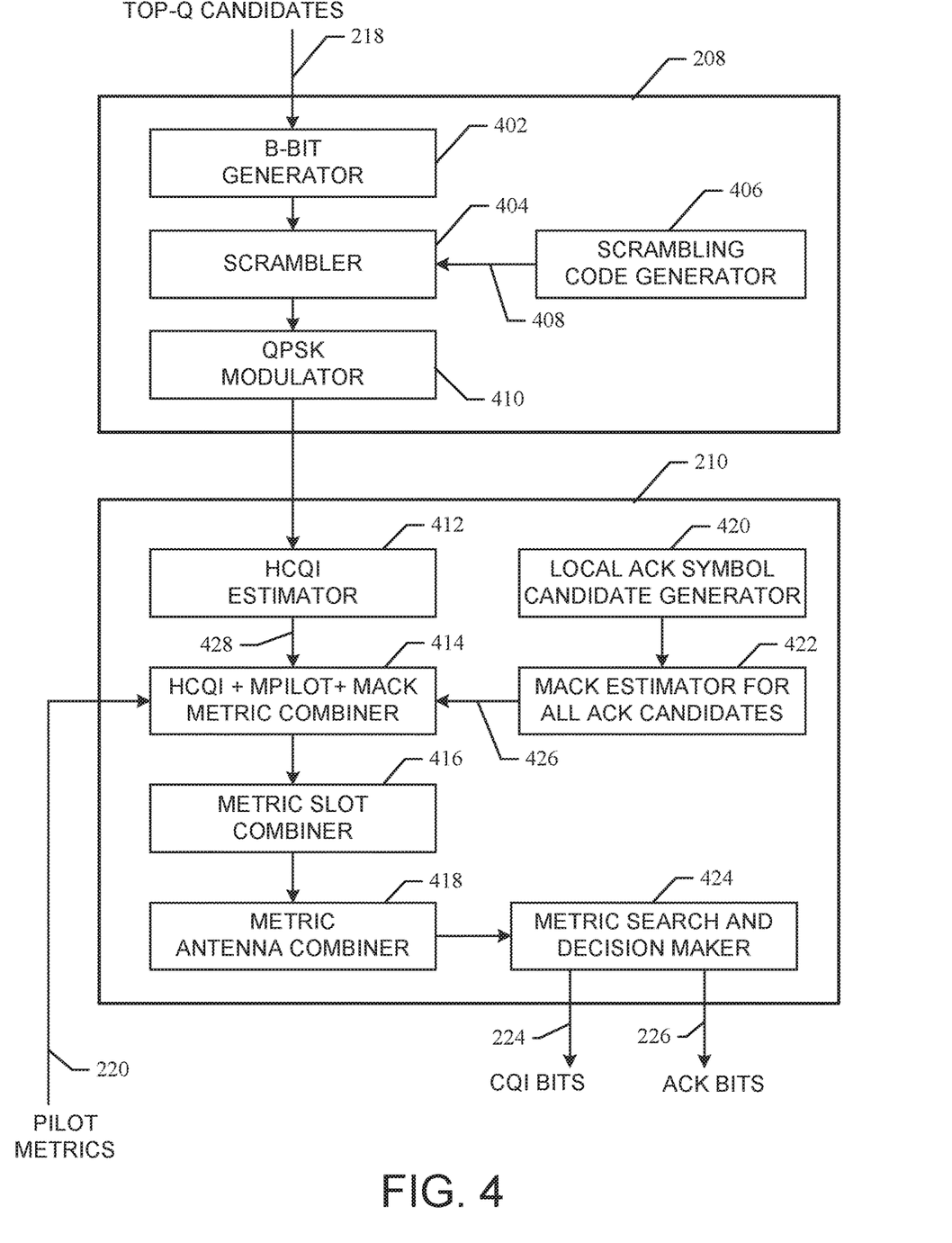
FIG. 4 shows exemplary embodiments of a Top-Q CQI symbol generator and a joint detector shown in FIG. 2.

FIG. 4 shows exemplary embodiments of the Top-Q CQI symbol generator 208 and the joint detector 210 shown in FIG. 2. In an exemplary embodiment, the Top-Q CQI symbol generator 208 comprises a B-bit generator 402, scrambler 404, scrambling code generator 406, and QPSK modulator 410. In an exemplary embodiment, the B-bit generator 402 effectively generates encoded bits $[\tilde{b}_0, \ldots, \tilde{b}_{19}]_{(0:Q-1)}$ from the Top-Q candidates 218. In an exemplary embodiment, the B-bit generator 402 uses a traditional RM (20, A) encoder. In another exemplary embodiment, a LUT-based implementation is utilized that uses the a-bits $[\tilde{a}_0, \ldots, \tilde{a}_{A-1}]_{(0:Q-1)}$ as entry addresses to access pre-defined values of the B-bits, which can simplify the implementation complexity.

In an exemplary embodiment, the scrambling code generator 406 generates a scrambling code 408 that is input to the scrambler 404. The scrambler 404 uses the scrambling code 408 to generate scrambled Top-Q candidate CQI bits $[\tilde{\tilde{b}}(0), \ldots, \tilde{\tilde{b}}(19)]_{(0:Q-1)}$. These bits for each candidate are passed to the QPSK modulator 410 to generate the Top-Q CQI symbols $[\tilde{d}(0), \ldots, \tilde{d}(9)]_{(0:Q-1)}$ that are input to the joint detector 210.

In an exemplary embodiment, the joint detector 210 comprises HCQI estimator 412, metric combiner 414, metric slot combiner 416, metric antenna combiner 418, ACK symbol candidate generator 420, ACK metric estimator 422, and metric search and decision maker 424.

In an exemplary embodiment, all the top-Q CQI symbols are used to estimate an energy metric HCQI as shown for the purpose of maximum-likelihood detection. This is done by the HCQI estimator 412 as shown in the following expression.

$$\text{Metric}_{(0:Q-1)}^{CQI,ns,(t,x)} = f(h_{ns,r}^{CQI}, d_{(0:Q-1)}),$$

where $h_{ns,r}^{CQI}$ the CQI channel estimation vector for the $r^{th}$ receive antenna for the $ns^{th}$ slot within a subframe, $d_{(0:Q-1)}$ is the $[0: Q-1]^{th}$ Top-Q symbol candidate vector that is composed of the $[\tilde{d}(0), \ldots, \tilde{d}(9)]_{(0:Q-1)}$. The function $f(x)$ is a metric computation function that can be applied as an effective ML-decision metric for the Q candidate CQI bit sequences.

For the cases Format 2a/2b, there is also a local ACK symbol candidate generator 420 to produce the possible all possible ACK symbols. This is effectively implemented by using the ACK bit candidates for BPSK/QPSK modulation for Format 2a/2b scenarios, respectively. The candidate ACK symbols will be used to generate the metric related to the ACK symbols in Mack estimator 422 as $\text{Metric}_j^{ACK,ns,r}$. The metrics from pilot 220, ACK symbol candidates 426 and the CQI candidates 428 are combined in metric combiner 414 to produce a combined metric within a slot and are passed to the slot combiner 416 and antenna combiner 418 to generate the overall metric for the combined search space of [0:Q−1] CQI candidates and the [0:2^Nack−1] ACK candidates as $\text{Metric}_{[0:Q-1]}^{All,j}$.

The metric search and decision maker 424 searches all the possible space of the Top-Q CQI candidates and all ACK bit candidates to determine the final detected CQI bits $\hat{a}_0, \ldots, \hat{a}_{A-1}$ and {0/1/2} ACK bits $\hat{b}(20), \ldots, \hat{b}(M_{bit}-1)$ for Formats 2/2a/2b, respectively. Specifically, the final detected bit sequences are:

$$[\hat{a}_0, \ldots, \hat{a}_{A-1}, \hat{b}(20), \ldots, \hat{b}(M_{bit}-1)] = \underset{j,q}{\text{argmax}}(\text{Metric}_{q \in [0:Q-1]}^{All,j}).$$

In an exemplary embodiment, a metric definition that effectively can be used as a maximum likelihood metric is shown in the following expression.

$$Metric_{(0:Q-1)}^{All,j} = $$

$$\sum_r \sum_{n_s} \left[ (h_{pilot}^{n_s})^2 + |r_{Ack}^{n_s,r} \cdot (s_{Ack}^j)^*|^2 + \sum_{l=0}^{4} |r_{CQI}^{n_s,r}(l) \cdot (\tilde{d}(l \% 5)_{(0:Q-1)})^*|^2 \right]$$

Figure 5:
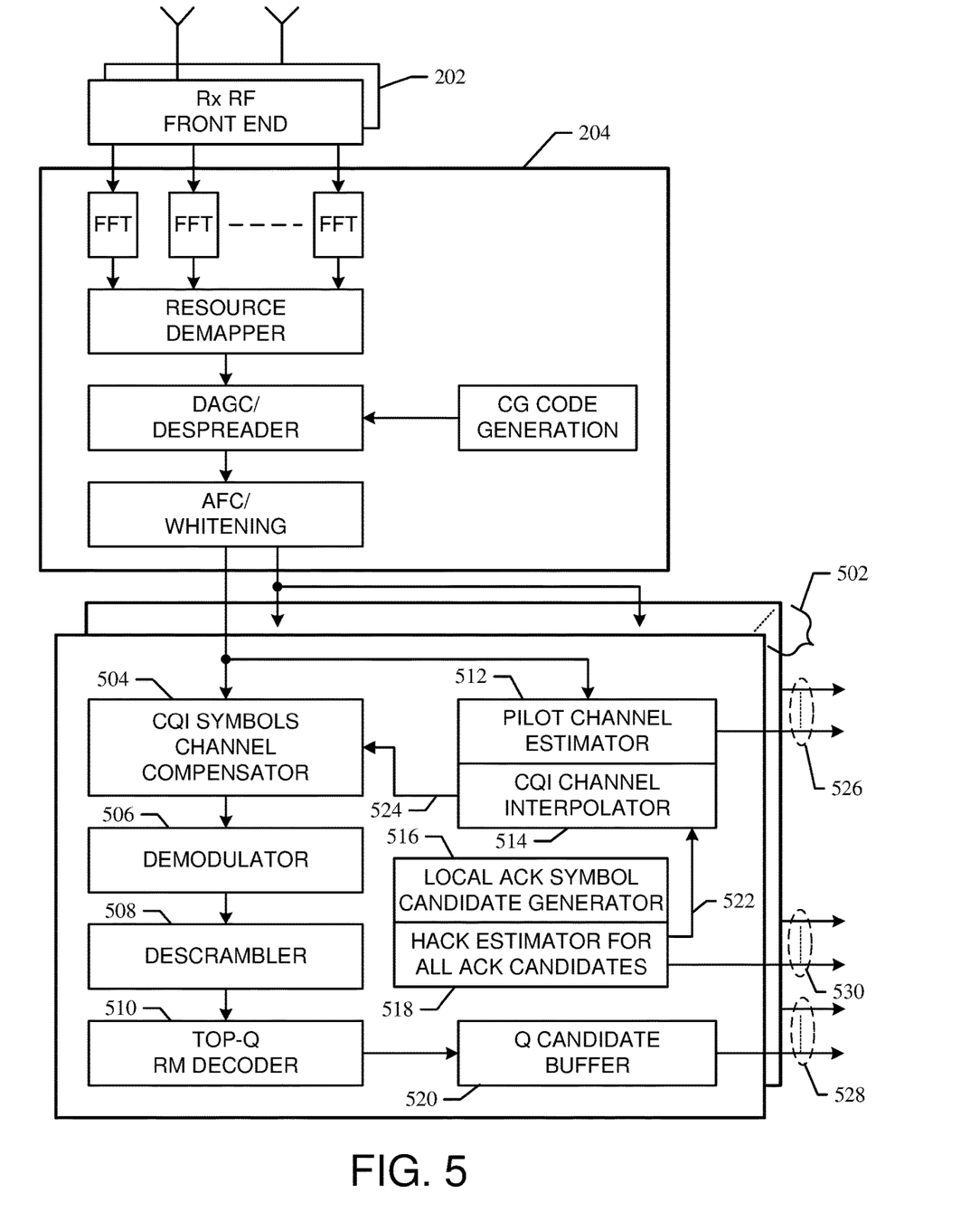
FIG. 5 shows an alternative exemplary embodiment the CCD that includes multiple Top-Q candidate detector branches.

FIG. 5 shows an alternative exemplary embodiment the CCD 118 that includes multiple Top-Q candidate detector branches 502. Since the baseband front end 204 is discussed above, a description of the baseband front end 204 will not be repeated here.

The Top-Q candidate detector branches 502 follow the baseband front-end receiver 204. Each branch of the Top-Q candidate branches 502 includes CQI symbol channel compensator 504, demodulator 506 for CQI symbols, descrambler 508 for the CQI bits, a Top-Q (20,A) RM list-decoder 510 to produce the Top-Q likely CQI candidates for each of the $j^{th}$ ACK branch, $[\tilde{a}_0, \ldots, \tilde{a}_{A-1}]_{(0:Q-1)}^j$. Pilot symbol channel estimator 512 generates a pilot channel estimate 526. The $j^{th}$ ACK symbol channel estimator comprises a local ACK symbol candidate generator 516 and a Hack estimator 518 for the $j^{th}$ branch. A CQI channel interpolator 514 is optional to generate the channel estimation 524 for all the CQI symbols input to the CQI symbols channel compensator 504. The $j^{th}$ ACK branch of the Top-Q CQI estimator is then followed by each branch of top-Q CQI symbol generator 602.

Figure 6:
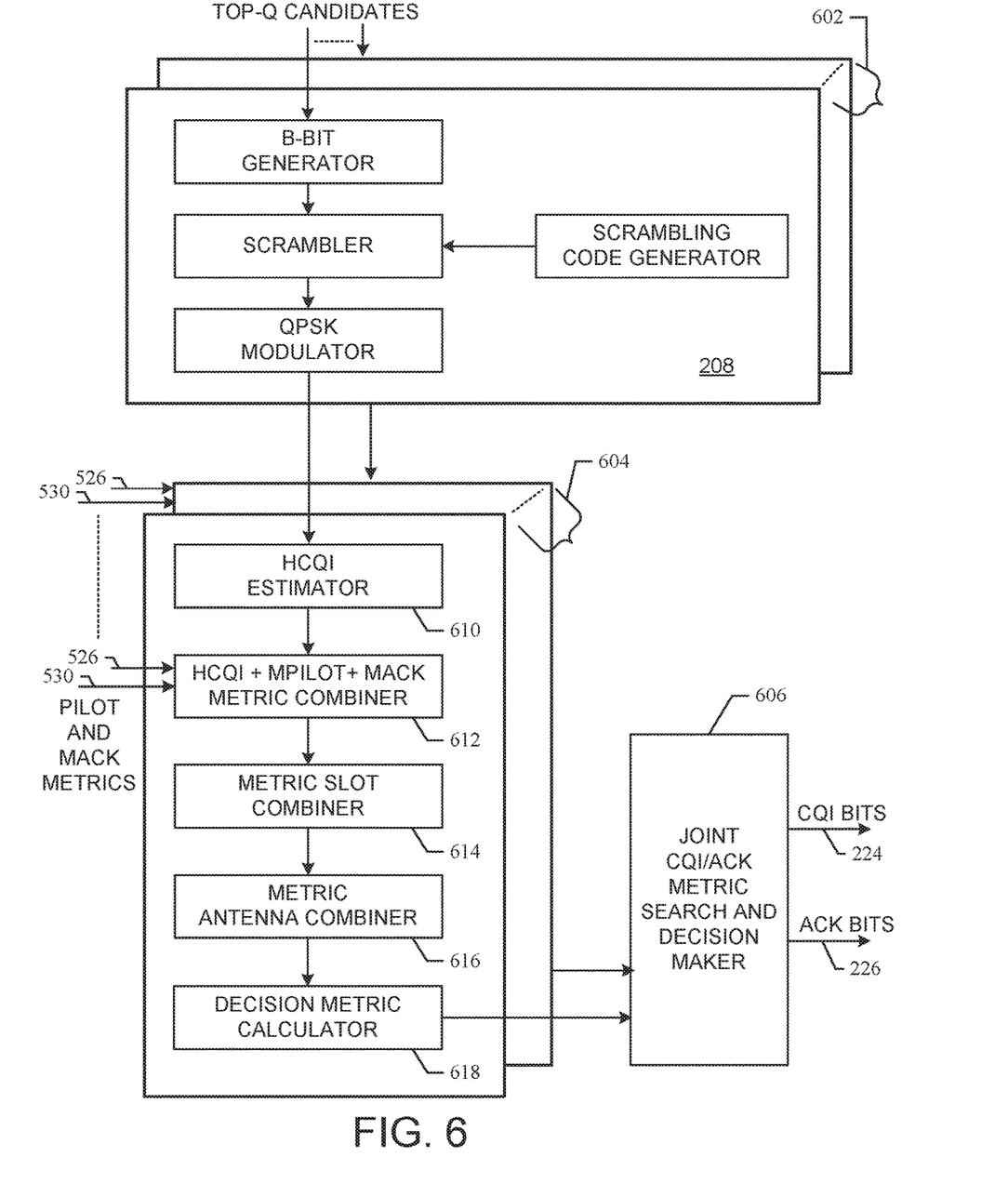
FIG. 6 shows an alternative exemplary embodiment of the CCD that includes multiple branches of the symbol generator and a joint detector.

FIG. 6 shows an alternative exemplary embodiment of the CCD 118 that includes multiple branches 602 of the symbol generator 208, metric calculator branches 604, and a joint detector 606. The multiple branches 602 of the symbol generator 208 are used to generate symbols for the Top-Q CQI candidates associated with each candidate ACK. The branches 602 include the B-bit generator 402 that generates signals $[\check{b}_0, \ldots, \check{b}_{19}]_{(0:Q-1)}^j$, scrambler 404 that generates signals $[\tilde{b}(0), \ldots, \tilde{b}(19)]_{(0:Q-1)}^j$, and QPSK modulator 410 that generates signals $[\tilde{d}(0), \ldots, \tilde{d}(9)]_{(0:Q-1)}^j$, for the j=[0,2^Nack-1] branches. The output of the modulator 410 for each branch is passed to the joint metric calculator branches 604.

Each branch of the joint CQI/ACK/Pilot Metric Calculator branches 604 comprises HCQI estimator 610, HCQI+ HPilot+Hack metric combiner 612, slot metric combiner 614, antenna metric combiner 616, as well as a decision metric calculator 618. The joint metric calculator branches 604 generate a combined metric search space that accounts for all CQI candidates and all ACK candidates. This search space is then input to a joint CQI/ACK metric search and decision maker 606.

The joint CQI/ACK metric search and decision maker 606 collects all the Top-Q CQI candidates for the 2^Nack ACK branches to produce the final detection of the CQI bits $\hat{a}_0, \ldots, \hat{a}_{A-1}$ and the ACK bits $\hat{b}(20), \ldots, \hat{b}(M_{bit}-1)$ from a maximum likelihood search of (Q*2^Nack) candidates. For example, the search space can be expressed as the following.

$$[\hat{a}_0, \ldots, \hat{a}_{A-1}, \hat{b}(20), \ldots, \hat{b}(M_{bit}-1)] = \underset{j,q}{\operatorname{argmax}}(Metric_{q \in [0:Q-1]}^{All,j}).$$

Figure 7:
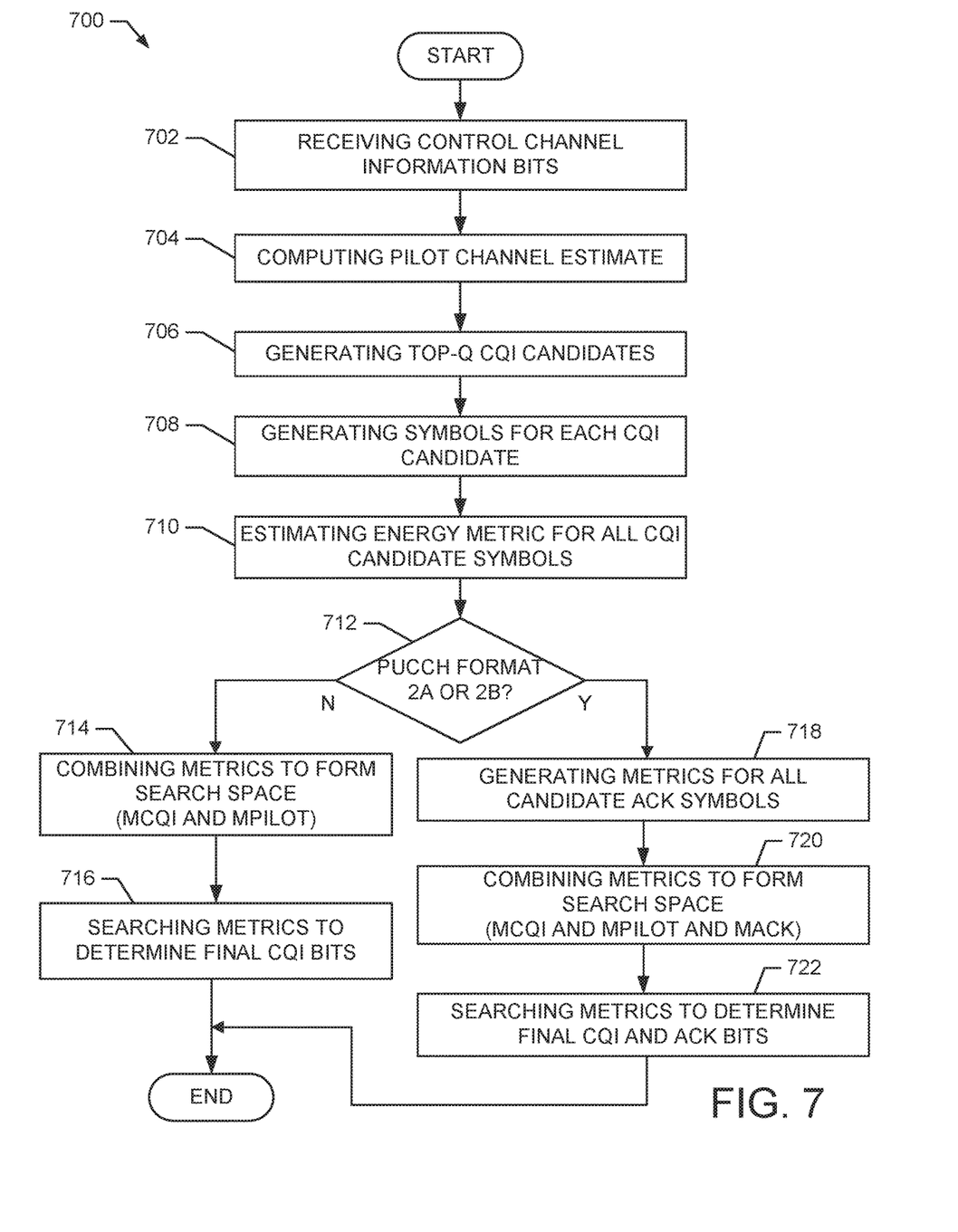
FIG. 7 shows an exemplary method for control channel detection.

FIG. 7 shows an exemplary method 700 for control channel detection. For example, the method 700 is suitable for use with the CCD 118 shown in FIGS. 3-4 and FIGS. 5-6.

Block 702 comprises an operation of receiving control channel information bits. For example, control channel bits comprising CQI bits are received by Top-Q candidate CQI bits generator 206 from the baseband front end 204.

Block 704 comprises an operation of determining a pilot channel estimate. For example, the pilot channel estimate is determined by the pilot channel estimator 322 or the pilot channel estimator 512.

Block 706 comprises an operation generating Top-Q CQI candidates from the received control channel information. For example, the received CQI information passes through the channel compensator 314, demodulator 316 and descrambler 318 and is input to the Top-Q RM decoder 320. The RM decoder 320 decodes the received CQI bits to determine the Top-Q CQI candidates that are stored in the Top-Q CQI candidate buffer 328. It should be noted that similar functions are performed by each of the branches 502 shown in FIG. 5.

Block 708 comprises an operation of generating symbols for each of the Top-Q CQI candidates. For example, this operation is performed by the Top-Q CQI candidate symbol generator 208 shown in FIG. 4 or the similarly by each of the symbol generator branches 602 shown in FIG. 6.

Block 710 comprises an operation of estimating an energy metric for all CQI candidate symbols. For example, this operation is performed by the HCQI estimator 412 shown in FIG. 4. It should also be noted that this operation is similarly performed by the HCQI estimator 610 shown in FIG. 6.

Block 712 comprises an operation of determining whether the PUCCH is formatted in Format 2a or 2b. If the PUCCH is formatted in Format 2 there are not ACK bits in the control information. If the PUCCH is formatted in Format 2a or 2b, there are ACK bits in the control information. For example, Table 1 illustrates the makeup of the control bits for each PUCCH format. If the PUCCH is formatted in format 2a or 2b, then the method proceeds to block 718. If the PUCCH is not formatted in format 2a or 2b, then the method proceeds to block 714.

Block 714 comprises an operation of combining CQI candidate metrics (MCQI) with the pilot metrics (MPILOT) to form a search space. For example, the metrics combiner 414 shown in FIG. 4 performs this operation. Similarly, metrics combiner 612 for each branch shown in FIG. 6 performs this operation.

Block 716 comprises an operation of searching the combined metric space to determine the final CQI bits. For example, the decision maker 424 performs this operation. Similarly, the joint decision maker 606 shown in FIG. 6 performs this operation.

Block 718 comprises an operation of generating a metric for all candidate ACK symbols. For example, this operation is performed by the MACK estimator 422 shown in FIG. 4 and similarly in each of the branches 502 by the HACK estimator 518 shown in FIG. 5.

Block 720 comprises an operation of combining CQI candidate metrics (MCQI), the pilot metrics (MPILOT), and the MACH metrics to form a search space. For example, the metrics combiner 414 shown in FIG. 4 performs this operation. Similarly, for each branch 604, the metrics combiner 612 shown in FIG. 6 performs this operation.

Block 722 comprises an operation of searching the combined metric space to determine the final CQI bits and ACK bits. For example, the decision maker 424 performs this operation. Similarly, the joint decision maker 606 shown in FIG. 6 performs this operation.

Thus, the method 700 operates to efficiently detect control bits received in an uplink PUCCH transmission. It should be note that the operation of the method 700 are exemplary and may be changed, modified, added to, delete from, and/or rearranged within the scope of the embodiments.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method, comprising:
   collecting, by a front-end component, signals from resource locations by a resource demapper after received radio frequency (RF) signals from an uplink control channel are converted from time domain signals to frequency domain signals;
   generating, by a Top-Q candidate generator, Top-Q candidate Channel Quality Indicator (CQI) bits via demodulation, descrambling, and a Top-Q Reed-Muller (RM) decoder in accordance with the signals, wherein Q is selected number of candidates;
   generating, by a Top-Q symbol generator, a CQI symbol for each of the Top-Q candidate CQI bits;
   generating, by a joint detector, a CQI energy metric from the CQI symbols;
   if the uplink control channel is formatted in format 2, performing operations of:
      combining the CQI energy metric with a pilot energy metric to generate a combined metric; and
      searching the combined metric to determine transmitted CQI bits;
   if the uplink control channel is formatted in format 2a or format 2b, performing operations of:
      generating an acknowledgement (ACK) energy metric for ACK candidate symbols;
      combining the CQI energy metric, the pilot energy metric, and the ACK energy metric to generate the combined metric; and
      searching the combined metric to determine the transmitted CQI bits and transmitted ACK bits.

2. The method of claim 1, wherein the uplink control channel is a physical uplink control channel (PUCCH) in a telecommunication system and wherein the PUCCH includes one or both of CQI information bits and ACK information bits.

3. The method of claim 2, wherein the Top-Q RM decoder performs an operation of searching internal computation metrics for all possible entries of the CQI information bits to determine the Top-Q candidate CQI bits.

4. The method of claim 1, wherein generating the CQI symbols comprises:
   generating encoded bits from each of the Top-Q candidate CQI bits;
   scrambling the encoded bits to generate scrambled bits; and
   modulating the scrambled bits to generate the CQI symbols.

5. The method of claim 1, further comprising an operation of estimating the pilot energy metric from pilot reference signals in a received subframe.

6. The method of claim 1, wherein the operation of searching to determine transmitted CQI bits comprises performing a maximum likelihood metric on the combined metric to determine the transmitted CQI bits.

7. An apparatus comprising:
   a front-end component having a fast Fourier transform (FFT) processors, a demapper, and a despreader, the front-end component configured to collect information from resource locations via the demapper after received radio frequency (RF) signals from an uplink control channel are converted by the FFT processors from time domain signals to frequency domain signals;
   a Top-Q Reed-Muller (RM) decoder that generates Top-Q candidate Channel Quality Indicator (CQI) bits via demodulation and descrambling the information, wherein Q is selected number of candidates;
   a symbol generator that generates a CQI symbol for each of the Top-Q candidate CQI bits;
   an estimator that generates a CQI energy metric for the CQI symbols;
   an energy metric combiner that combines the CQI energy metric with a pilot energy metric to generate a combined metric if the uplink control channel is formatted in format 2, and wherein the energy metric combiner combines the CQI energy metric, the pilot energy metric, and an acknowledgement (ACK) energy metric to generate the combined metric if the uplink control channel is formatted in format 2a or format 2b; and
   a metric searcher that searches the combined metric to determine transmitted CQI bits if the uplink control channel is formatted in the format 2, and to determine the transmitted CQI bits and transmitted ACK bits if the uplink control channel is formatted in the format 2a or 2b.

8. The apparatus of claim 7, wherein the uplink control channel is a physical uplink control channel (PUCCH) in a telecommunication system and wherein the PUCCH includes one or both of CQI information bits and ACK information bits.

9. The apparatus of claim 8, wherein the Top-Q RM decoder searches internal computation metrics for all possible entries of CQI information bits to determine the Top-Q candidate CQI bits.

10. The apparatus of claim 7, wherein the symbol generator comprises:
    a B-bit generator that generates encoded bits from each of the Top-Q candidate CQI bits;
    a scrambler that scrambles the bits to generate scrambled bits; and
    a modulator that modulates the scrambled bits to generate the CQI symbols.

11. The apparatus of claim 7, further comprising a pilot channel estimator that estimates the pilot energy metric from pilot reference signals in a received subframe.

12. The apparatus of claim 7, further comprising buffer that stores the Top-Q candidate CQI bits.

13. The apparatus of claim 7, further comprising an CQI estimator that estimates the CQI energy metric for the CQI symbols.

14. The apparatus of claim 7, further comprising an ACK candidate symbol generator that generates ACK candidate symbols.

15. The apparatus of claim 14, further comprising an ACK estimator that estimates the ACK energy metric for the ACK candidate symbols.

16. The apparatus of claim 7, wherein the energy metric combiner further comprises a metric slot combiner and a metric antenna combiner.

17. The apparatus of claim 7, wherein the metric searcher performs a maximum likelihood metric to determine the transmitted CQI bits.

18. An apparatus comprising:
a front-end component, having a fast Fourier transform (FFT) processors, a demapper, and a despreader, configured to provide baseband signals via the demapper and the despreader after radio frequency (RF) signals received from an uplink control channel are converted by the FFT processors from time domain signals to frequency domain signals;
a Top-Q candidate generator, containing a pilot channel estimator, a demodulator, a descrambler, a decoder, and a candidate buffer, and configured to generate a pilot channel metrics by the pilot channel estimator in response to the baseband signals and storing Top-Q candidate Channel Quality Indicator (CQI) bits in the candidate buffer by the decoder, wherein Q is selected number of candidates;
a symbol generator coupled to the front-end component and operable to generate a CQI symbol for each of the Top-Q candidate CQI bits retrieved from the candidate buffer;
a detector coupled to the symbol generator and containing a metric combiner that combines a CQI energy metric with a pilot channel metric to generate a combined metric if the uplink control channel is formatted in format 2; and
a metric searcher that searches the combined metric to determine transmitted CQI bits if the uplink control channel is formatted in the format 2,
wherein the energy metric combiner combines the CQI energy metric, the pilot energy metric, and an acknowledgement (ACK) energy metric to generate the combined metric if the uplink control channel is formatted in format 2a or format 2b.

19. The apparatus of claim 18, wherein the metric searcher searches the combined metric to determine the transmitted CQI bits and transmitted ACK bits if the uplink control channel is formatted in the format 2a or 2b.

* * * * *